Sept. 29, 1959 H. W. SCHAEFER ET AL 2,906,104
APPARATUS FOR TREATING FOODSTUFFS
Filed Dec. 19, 1955 2 Sheets-Sheet 1

INVENTORS
HAROLD W. SCHAEFER
FRANKLIN W. EDWARDS
BY
Carl H. Synnestvedt
AGENT

Sept. 29, 1959 H. W. SCHAEFER ET AL 2,906,104
APPARATUS FOR TREATING FOODSTUFFS
Filed Dec. 19, 1955 2 Sheets-Sheet 2

INVENTORS
HAROLD W. SCHAEFER
FRANKLIN W. EDWARDS
BY
Carl H. Synnestvedt
AGENT

# United States Patent Office 2,906,104
Patented Sept. 29, 1959

2,906,104

APPARATUS FOR TREATING FOODSTUFFS

Harold W. Schaefer, Philadelphia, and Franklin W. Edwards, Narberth, Pa., assignors to Philco Corporation, Philadelphia, Pa., a corporation of Pennsylvania Application December 19, 1955, Serial No. 553,983

8 Claims. (Cl. 62—264)

This invention relates to treating materials by radiation, and more particularly to apparatus useful in irradiation of foodstuffs. While of broader utility, apparatus embodying the principles of this invention is especially adapted to the treating of foodstuffs housed within a refrigerated cabinet.

In considering the invention it is to be borne in mind that it has proven desirable to provide within a refrigerated cabinet a compartment not only capable of being maintained at temperatures suitable for the preservation of foods, but also capable of being maintained under conditions detrimental to propagation of bacteria therein. It is known that ultraviolet radiation, for example, has bactericidal effects, but use thereof has heretofore presented difficulties inasmuch as it has been found that the degree of exposure of foodstuffs to radiation is a critical consideration if satisfactory sterilization is to be achieved without such adverse effects as "food burn," discoloration, or "off" tastes. Excessive direct radiation has long been a problem impeding the design of apparatus for treatment of foods within a household refrigerator cabinet, inasmuch as, inevitably, there are only short distances between the source of radiant energy (e.g. an ultraviolet lamp) and nearby foods, within a cabinet of this type. Even if the source be activated only intermittently, excessive radiation of such nearby foods has resulted.

Accordingly it is an object of this invention to provide means for maintaining irradiation of materials within advantageous limits.

It is another object of this invention to provide a novel method of subjecting foods, or other materials, to measured amounts of radiation.

It is another object of this invention to provide novel means for substantially uniformly distributing, over a predetermined area, ultraviolet rays emitted from a substantially "point" source.

Still another object is to provide an improved method of subjecting materials to sterilizing radiations through recurring intervals of predetermined duration.

In the achievement of the foregoing general ends, a preferred embodiment of the invention provides, in novel combination with a storage cabinet, for example a household refrigerator of known type, in the food storage compartment thereof, bactericidal irradiating means, comprising: a housing, preferably although not necessarily adapted to permit passage of circulated cabinet air therethrough; a source of radiation disposed within said housing; an element opaque to said radiation disposed adjacent the source, and adapted for movement in the paths of emitted rays, said element having an aperture disposed therein to direct less than all of the emitted sterilizing rays upon predetermined adjacent areas within the food compartment; and means for effecting motion of the movable element whereby the aperture therein is caused to move, in a predetermined manner, thereby affording the desired effective intensity of radiation within the cabinet. Importantly, this novel apparatus provides not only continuous ultraviolet radiation effective in treating of air-borne bacteria, but efficient intermittent and non-injurious irradiation of foodstuffs, or other materials, as well.

The manner in which the objects and advantages of the invention may best be achieved will be clearly understood from a consideration of the following description, taken in conjunction with the accompanying drawing in which.

Figure 1:
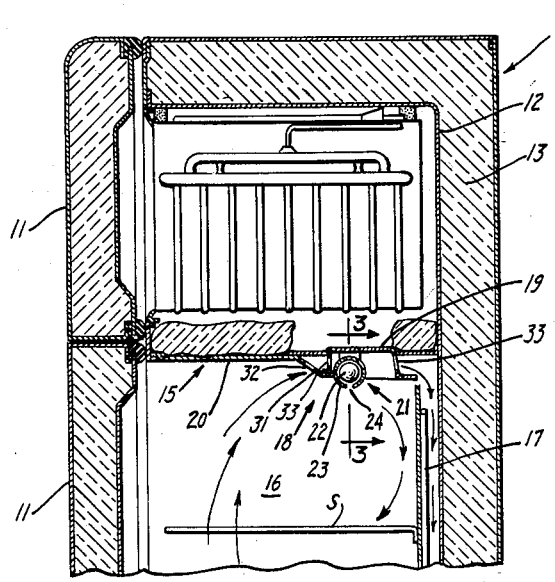
Figure 1 is a fragmentary view, partly in section and partly in elevation, of a refrigerator cabinet showing the invention embodied therein.
Figure 2:
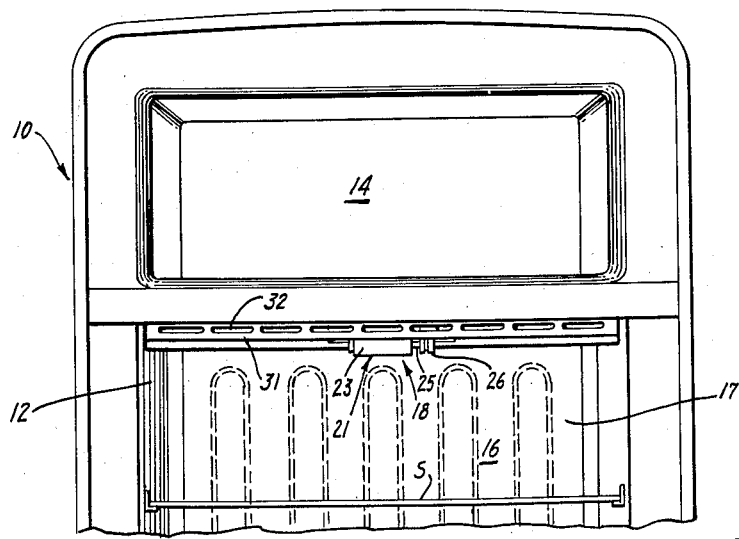
Figure 2 is a perspective showing of the upper portion of the cabinet with doors removed.
Figure 3:
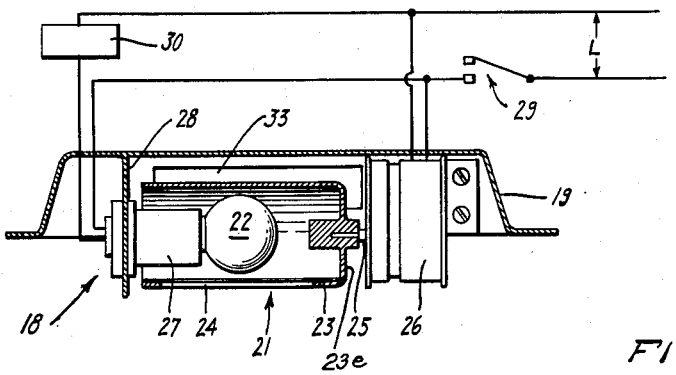
Figure 3 is an enlarged view of the novel sterilizing apparatus taken substantially along the line 3—3 of Figure 1, showing elements partly in section and partly in elevation, and including a diagrammatic representation of the wiring of the apparatus.

Now making more detailed reference to the drawings, and more particularly to Figures 1 and 2 thereof, there is shown an enclosure, which for exemplary purposes may be a refrigerator cabinet including an outer shell 10, insulated closure members, or doors, 11, and a cabinet liner 12 separated from the outer shell 10 by suitable thermal insulation 13. Disposed within the cabinet is a freezing compartment 14, below which may lie an insulating partition, or baffle, 15. This partition serves to isolate the freezing compartment from the food storage compartment 16, and the latter may be refrigerated through the agency of a suitable cooling means, such as, for example, cooling plate or evaporator, 17. Suitably mounted in the food storage compartment 16, and more specifically, by way of example, in a recessed portion of the insulating wall or partition 15, is the sterilizing apparatus 18 with which this invention is concerned. It will be understood that the refrigerator also includes refrigerant circulating means, for example, a known type of refrigerant condensing unit; however illustration and description of this portion of the refrigerator will not be necessary herein inasmuch as this invention is not concerned therewith. The apparatus 18 includes a housing 19 carried by the lower portion of the partition 15, for example in the baffle-like lower wall 20 thereof, to be hereinafter more fully described, and radiating means 21 disposed therein, which includes (Figure 3) an ultraviolet lamp 22 of known design, disposed within a hollow cylindrically formed rotatable element 23 including closed end portion 23e having a longitudinal slot 24 provided therein. The cylindrical element 23 is mounted from end portion 23e upon a rotatable shaft 25, the shaft being driven by suitable means 26, which, in the illustration of this embodiment, comprises an electrically energizable motor mounted within the recess or housing 19. The lamp may be supported by a socket 27, of known design, the latter being supported by a bracket 28 formed, for example, as an integral element with the housing 19 and extending into the rotatable element 23 through the open end thereof. Energizing means for the sterilizing apparatus includes line L (Figure 3) one side of which may be opened or closed by switch means 29. Connected across the line L, in parallel circuitry, are the motor 26 and the lamp 22. The lamp itself is disposed in series circuitry with a suitable ballast, shown at 30, of known design for use with ultraviolet lamps of the type shown, although to which this invention is not limited. Switch 29 may be disposed in a suitable location for operation by opening or closing the cabinet door, whereby the sterilizing apparatus may be deenergized upon opening the door and energized at its closing. It is understood that other suitable means for interrupting the current supply to the apparatus may be employed as well.

There may be suitably disposed within the compartment 16 shelving S, of known design, upon which articles such as food (not shown), to be stored and treated, may be placed.

The baffle, or partition, means 15 (Figures 1 and 2) may include an air circulating duct 31 having apertures, or slots 32 provided therein. In substantial registry with certain of the slots 32 are slots 33 provided in the housing or recess 19, said slots providing access to duct means 31. The duct means may be, if desired, of the type disclosed in U.S. Patent No. 2,707,871, which is assigned to the assignee of the present invention. Arrows show the general circulatory path of air within the cabinet, and with particular respect to duct 31.

Figure 4:
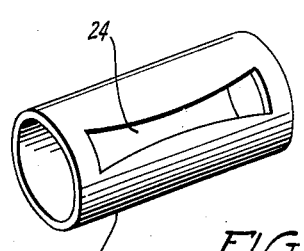
Figure 4 is a perspective showing of an element of the apparatus shown in Figure 3.
Figure 5:
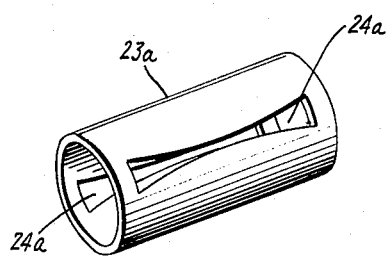
Figure 5 is a perspective showing of a modified embodiment of the element shown in Figure 4.

There appears in Figure 4, a perspective view of the rotative element 23, in which an aperture 24 is shown. The aperture is disposed in the curved wall of the cylindrical element, and the longitudinal axis about which the slot has its symmetry lies generally parallel to the axis about which the cylinder is formed, and extends across the cabinet. The aforementioned slot, or aperture 24, may have generally arcuate sides, as shown, of a configuration that serves to restrict comparatively intense ultraviolet rays emitted by the source in the region of the aperture's narrow section, yet permit more rays of somewhat lesser intensity to pass through the wider portions more remote from the source, thereby distributing ultraviolet rays of substantially equal total intensity along the axis of the aperture, and upon the "beaten zone" of the impinging rays, for example that area encompassed by shelving S. Shown in Figure 5 is a modified cylindrical element or mask 23a characterized by having provided therein a pair of diametrically opposed slots 24a, each being of lesser area than the single slot shown in Figure 4, but together providing an aperture substantially equivalent to a single larger aperture.

Considering the operation of apparatus constructed in accordance with the invention, it will be seen that certain operational advantages result in effective kill of both airborne and food-borne bacteria in combination with little or no detrimental effect upon the food itself.

At such time as the doors 11 are closed in the course of operation of the refrigerator cabinet 10 for food storage, there is defined a circulatory path of air to be cooled through duct means 31, thence across cooling plate 17, said path being designated by arrows. Inasmuch as the air itself contains bacteria to some degree, a portion of that bacteria borne by the air circulating in the region of the germicidal lamp, energized as by closing switch 29, will be eliminated by irradiation within the lamp housing. Energized along with the lamp 22 is the motor 26, the energization of the latter causing the cylindrical apertured shield or mask 23 to be revolved about lamp 22 in such manner as to prevent passage of the radiation into the cabinet during a portion of the cycle, that is, to contain the radiation, guide the ultraviolet rays, and to cause radiation to impinge upon predetermined successive portions of the shelf S, and may materials resting thereon, during other cyclic periods. It will be noted that the comparatively intense radiation which arrives at the central part of the aperture, due to its proximity to the source 22, is restricted by the relatively narrow central part of the aperture, to an extent greater than is the case with the less intense radiation arriving at the wider, lateral portions of the aperture. This results in all portions of the shelf receiving substantially equal irradiation, each time the "sweep" passes over the shelf. Rays not directed upon the materials, or foods, to be treated are so directed as to cause them to impinge upon portions of the housing 19 and upon certain of bacteria as may be borne by the circulated air passing through the housing, by way of slots 32 and 33.

Figure 6:
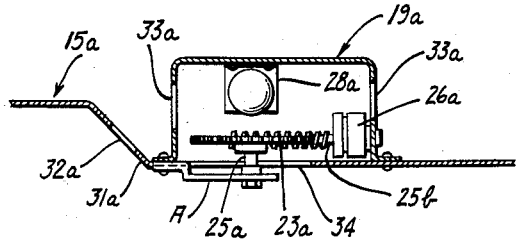
Figure 6 is a fragmentary sectional showing of refrigerator wall structure having attached thereto a modified embodiment of the disclosed sterilizing apparatus.
Figure 7:
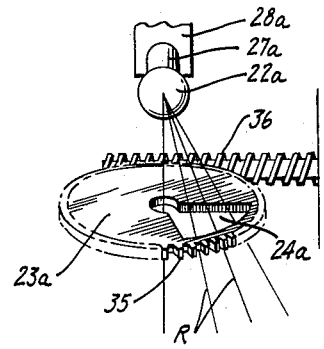
Figure 7 is a somewhat diagrammatic perspective showing of a portion of the sterilizing apparatus shown in Figure 6.

In the modification shown in Figures 6 and 7 the principles of this invention are embodied in sterilizing apparatus disposed within the housing 19a carried by the wall section 15a. The apparatus shown comprises a disc 23a, opaque to ultraviolet light, having an aperture 24a provided therein (Figure 7), and the disc 23a is mounted for pivotal movement, upon the spindle 25a carried by a support arm A attached to duct 31a and in the path of ultraviolet rays R emitted by the lamp 22a carried by the socket 27a supported by the bracket 28a attached to the housing. Below the disc 23a is an opening 34 having a general peripheral configuration conforming with that of the disc.

Disposed along the periphery of the disc 23a is worm gearing 35 adapted for interengagement with the driving worm 36 carried by the shaft 25b of motor 26a carried by housing 19a. The duct 31a and housing 19a are provided, respectively, with slots 32a and 33a through which air may flow.

Operation of this modified apparatus also takes place at such time as the lamp and motor are energized. Rotation of the motor shaft, with worm attached, imparts rotary motion to the apertured disc about its spindle whereupon rays emitted by the lamp and passing through the aperture are caused to "sweep" the desired underlying area at a rate providing the necessary irradiation of materials being treated. The slots 32a and 33a provided a circulatory path over the lamp in order that irradiation of air-borne bacteria may be effected, and again the more restrictive portion of the aperture 24a directly underlies the source of radiant energy.

Figure 8:
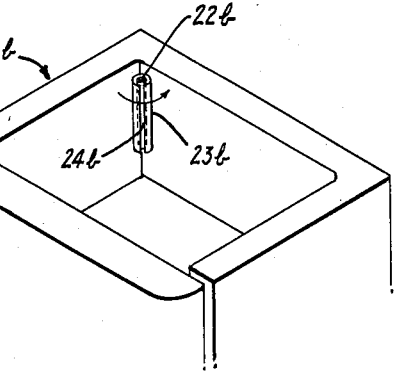
Figure 8 is a somewhat diagrammatic perspective showing of a cabinet, partly in section, including an additional embodiment of the invention.

There is shown in Figure 8 another embodiment of the present invention wherein a tubular sterilizing lamp 22b is disposed within a cabinet 10b. Mounted for rotation about the lamp is an apertured light shield 23b, the aperture 24b comprising, for example, an elongated slot extending along the wall of a cylinder and parallel to its axis. Rotation of the shield causes a narrow beam of light passing through the slot to "sweep" the interior of the cabinet thereby sequentially exposing contents thereof to predetermined periods of irradiation.

Figure 9:
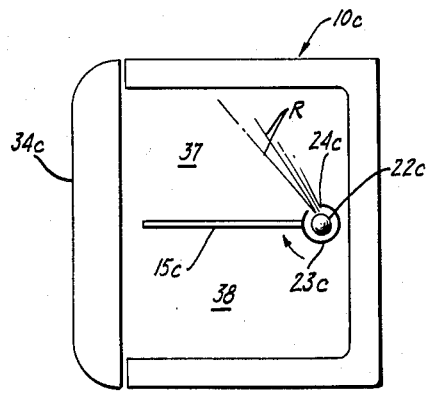
Figure 9 is a fragmentary sectional view of a cabinet including still another embodiment of the invention.

Still another embodiment is shown in Figure 9, wherein the wall 10c may comprise cabinet structure in which there is disposed a partition 15c defining compartments 37 and 38 having a common closure member 34c. Disposed within the cabinet, adjacent partition 15c, is a sterilizing lamp 22c around which is placed a sleeve-like element 23c adapted for rotation about the lamp, as shown. The sleeve has a slot-like aperture 24c which sweeps ultraviolet rays R emitted by the lamp alternately about successive portions of the interiors of upper and lower compartments 37 and 38.

From the foregoing description it will be understood that the present invention provides novel and improved irradiating means for the treatment of foodstuffs, or other materials requiring controlled and limited amounts of irradiation.

We claim:

1. In combination, a compartment for storing foodstuffs or other materials, a source of radiation adapted to irradiate the contents of said compartment, a movable shield disposed adjacent said source, said shield having an aperture provided therein, the portion of the aperture nearest the source being of lesser area than the portion of the aperture more remote from the source whereby the aperture in said shield is effective to provide irradiation of substantially equal intensity to predetermined portions of the interior of said compartment and of said foodstuffs or other materials, and driving means to impart motion to said movable shield and to cause controlled periods of impingement of the radiation from said source upon predetermined successive individual portions of the interior of the compartment.

2. In combination, a compartment for storing foodstuffs or other materials, a source of radiation adapted to irradiate the contents of said compartment, a movable shield comprising a hollow tubular sleeve of shielding material enclosing said source and having a longitudinal slot, portions of said slot disposed adjacent said source of radiation being of lesser width than portions spaced farther from said source whereby said shield is effective to provide irradiation of substantially equal intensity to predetermined portions of the interior of said compartment and of said foodstuffs or other materials, and driving means to impart motion to said movable shield and to cause controlled periods of impingement of radiation from said source upon predetermined successive individual portions of the interior of the compartment.

3. In combination, a compartment for storing foodstuffs or other materials, a source of radiation adapted to irradiate the contents of said compartment, a movable shield disposed adjacent said source and comprising a disk-like element of shielding material having a radially extending aperture, the center of said element being disposed adjacent said source, said aperture being of lesser width at the center of said element than at a region spaced from the center thereof whereby said aperture is effective to provide irradiation of substantially equal intensity of predetermined portions of the interior of said compartment and of said foodstuffs or other materials, and driving means to impart motion to said movable shield and to cause controlled periods of impingement of radiation from said source upon predetermined successive individual portions of the interior of the compartment.

4. In combination with cabinet structure, bactericidal irradiating means for sterilizing the contents of said cabinet structure, said means comprising: a substantially point source of bactericidal radiation; movable shield means enclosing said source in such manner that substantially all of the emitted sterilizing rays impinge upon said shield means, the latter means having an aperture therein so configured as to provide passage of a portion of such sterilizing rays; and means for moving said shield means continuously in such manner as to provide sequential transmission of the rays emitted by said source over the contents of said cabinet structure.

5. Apparatus in accordance with claim 4 being further characterized in that the portion of the aperture nearest the said point source is of lesser area than portions of the aperture more remote from the source whereby sterilizing rays passing through the aperture are of substantially equal intensity.

6. In apparatus for storing food or other articles, in combination, means including wall structure defining a storage compartment, said wall structure having a recessed portion presented toward the compartment, bactericidal irradiating means disposed in said recessed portion, said last named means comprising a source of bactericidal radiation and a rotatably movable cylinder enclosing said source and having an aperture therein, means for supporting food in said compartment, means for refrigerating said compartment, baffle means disposed in said compartment and being arranged to cause flow of air within said compartment sequentially through said recessed wall portion across the movable cylinder, and over said refrigerating means, the construction and arrangement being such that said irradiating means irradiates sequentially both predetermined successive individual areas of said supporting means and the air moving between said wall and said movable cylinder as it flows through said recessed wall portion.

7. Bactericidal irradiating means comprising: a hollow, cylindrically formed, rotatable member including a closed end portion and having an opening in the opposite end portion thereof, said member further having a longitudinal slot provided in a curved wall portion thereof; rotatable shaft means engaging said closed end portion to support said rotatable element; and a source of bactericidal radiation disposed within said cylindrical element and supported by bracket means extending through the open end portion of the latter.

8. Unitary bactericidal irradiating apparatus comprising: means defining a housing including lateral wall portions and an end wall portion, said lateral wall portions defining an opening opposite said end wall portion, and said lateral wall portions having apertures formed therein to accommodate the flow of air through the same; a hollow, cylindrically formed member extending between said lateral wall portions and including a closed end portion and having an opening in the opposite end portion thereof, said member further having a longitudinal slot provided in a curved wall portion thereof; drive means disposed within said housing and including rotatable shaft means engaging said closed end portion of said rotatable element to support the same; and a source of bactericidal radiation including bracket means carried by said housing to support said source, said bracket means extending through the open end portion of the cylindrical element and supporting said source within the latter, the construction and arrangement being such that air flowing through the apertures in the housing is irradiated alternately with areas disposed adjacent the open portion of the housing.

References Cited in the file of this patent

UNITED STATES PATENTS

| | | |
|---|---|---|
| 2,068,212 | Whitman | Jan. 19, 1937 |
| 2,072,417 | Berndt et al. | Mar. 2, 1937 |
| 2,096,746 | James | Oct. 26, 1937 |
| 2,315,285 | Dennington | Mar. 30, 1943 |
| 2,719,715 | Leahan | Oct. 4, 1955 |